United States Patent
Malcolmson et al.

(10) Patent No.: US 10,475,048 B2
(45) Date of Patent: Nov. 12, 2019

(54) METHOD AND SYSTEM FOR MANAGING A CUSTOMER LOYALTY AWARD PROGRAM

(75) Inventors: Jasper Angus Malcolmson, San Francisco, CA (US); Ashish Baldua, San Jose, CA (US); Gustavo Both Bitdinger, Chicago, IL (US); Lisa Marie Bruggeman, San Francisco, CA (US); Andy Bodart, Santa Clara, CA (US); Kenneth Ivar Kronquist, San Jose, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 406 days.

(21) Appl. No.: 13/205,398

(22) Filed: Aug. 8, 2011

(65) Prior Publication Data
US 2013/0041732 A1 Feb. 14, 2013

(51) Int. Cl.
*G06Q 30/02* (2012.01)

(52) U.S. Cl.
CPC ......... *G06Q 30/02* (2013.01); *G06Q 30/0207* (2013.01); *G06Q 30/0211* (2013.01); *G06Q 30/0222* (2013.01)

(58) Field of Classification Search
CPC . G06Q 30/02; G06Q 30/0226; G06Q 30/0229
See application file for complete search history.

(56) References Cited

U.S. PATENT DOCUMENTS

| | | | |
|---|---|---|---|
| 6,741,969 B1* | 5/2004 | Chen et al. | 705/14.27 |
| 7,578,430 B2 | 8/2009 | Hafer et al. | |
| 7,620,567 B2 | 11/2009 | George et al. | |
| 8,249,884 B2 | 8/2012 | Hakim et al. | |
| 2001/0011247 A1 | 8/2001 | O'Flaherty et al. | |
| 2002/0046109 A1 | 4/2002 | Farmaner et al. | |
| 2003/0009382 A1 | 1/2003 | D'Arbeloff et al. | |
| 2003/0158818 A1 | 8/2003 | George et al. | |
| 2004/0039640 A1* | 2/2004 | Koppelman et al. | 705/14 |
| 2004/0249710 A1 | 12/2004 | Montefeltri et al. | |
| 2005/0038768 A1* | 2/2005 | Morris | G06F 17/246 |
| 2005/0234796 A1* | 10/2005 | Lipper, III | 705/36 |
| 2006/0118611 A1 | 6/2006 | Hafer et al. | |
| 2006/0173744 A1* | 8/2006 | Kandasamy et al. | 705/14 |
| 2007/0033104 A1* | 2/2007 | Collins et al. | 705/14 |
| 2008/0011837 A1 | 1/2008 | Wesley | |
| 2008/0082415 A1* | 4/2008 | Shastry | 705/14 |
| 2008/0140524 A1* | 6/2008 | Anand et al. | 705/14 |
| 2008/0195483 A1* | 8/2008 | Moore | 705/14 |
| 2009/0125386 A1 | 5/2009 | Chirkoot et al. | |
| 2009/0240579 A1 | 9/2009 | Skowronek et al. | |

(Continued)

*Primary Examiner* — Vincent M Cao
(74) *Attorney, Agent, or Firm* — Greenblum & Bernstein, P.L.C.

(57) ABSTRACT

This invention discloses a novel system and method for implementing an electronic customer loyalty rewarding service that awards credits for continued patronage of a vendor, where the credits can be spent at the vendor or with other vendors that participate in the service. The disclosure further includes an embodiment where the system automatically calculates a discount voucher deal for a vendor with a guarantee spend amount per customer that uses the voucher. The system automatically trades these transactions in order to either electronically pay the guarantee or collect a commission on the overspend above the guarantee.

20 Claims, 7 Drawing Sheets

(56) References Cited

U.S. PATENT DOCUMENTS

| | | |
|---|---|---|
| 2010/0050201 A1* | 2/2010 | Kubota et al. .................. 725/12 |
| 2010/0180232 A1* | 7/2010 | Honan ................... G06Q 30/02 |
| | | 715/811 |
| 2012/0284108 A1 | 11/2012 | Fontana et al. |
| 2012/0316936 A1 | 12/2012 | Jacobs |
| 2012/0330744 A1* | 12/2012 | Aissa ......................... 705/14.38 |
| 2013/0035987 A1 | 2/2013 | Dreifus et al. |
| 2013/0041732 A1 | 2/2013 | Malcolmson et al. |

* cited by examiner

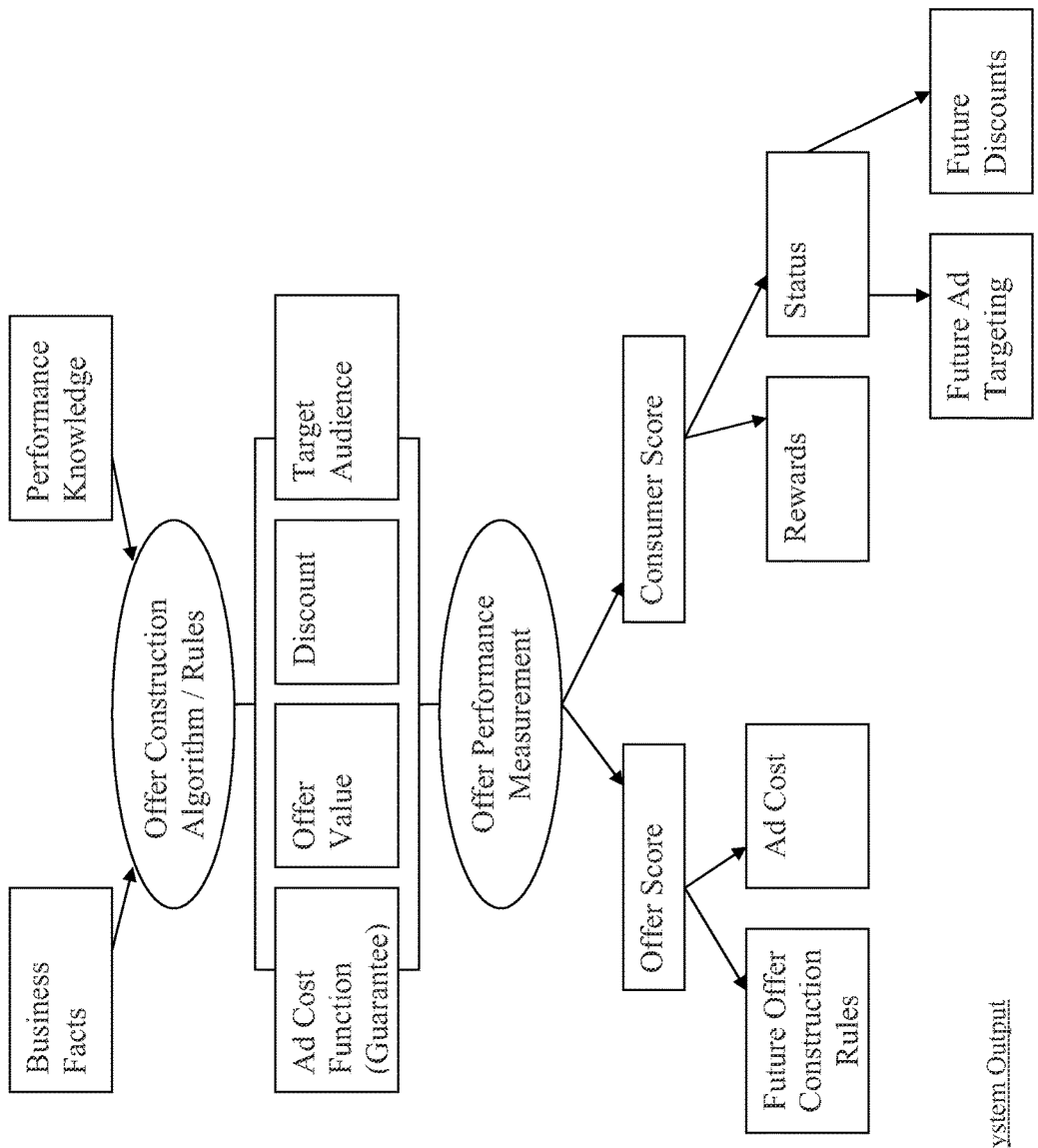
Figure 6: General System Output

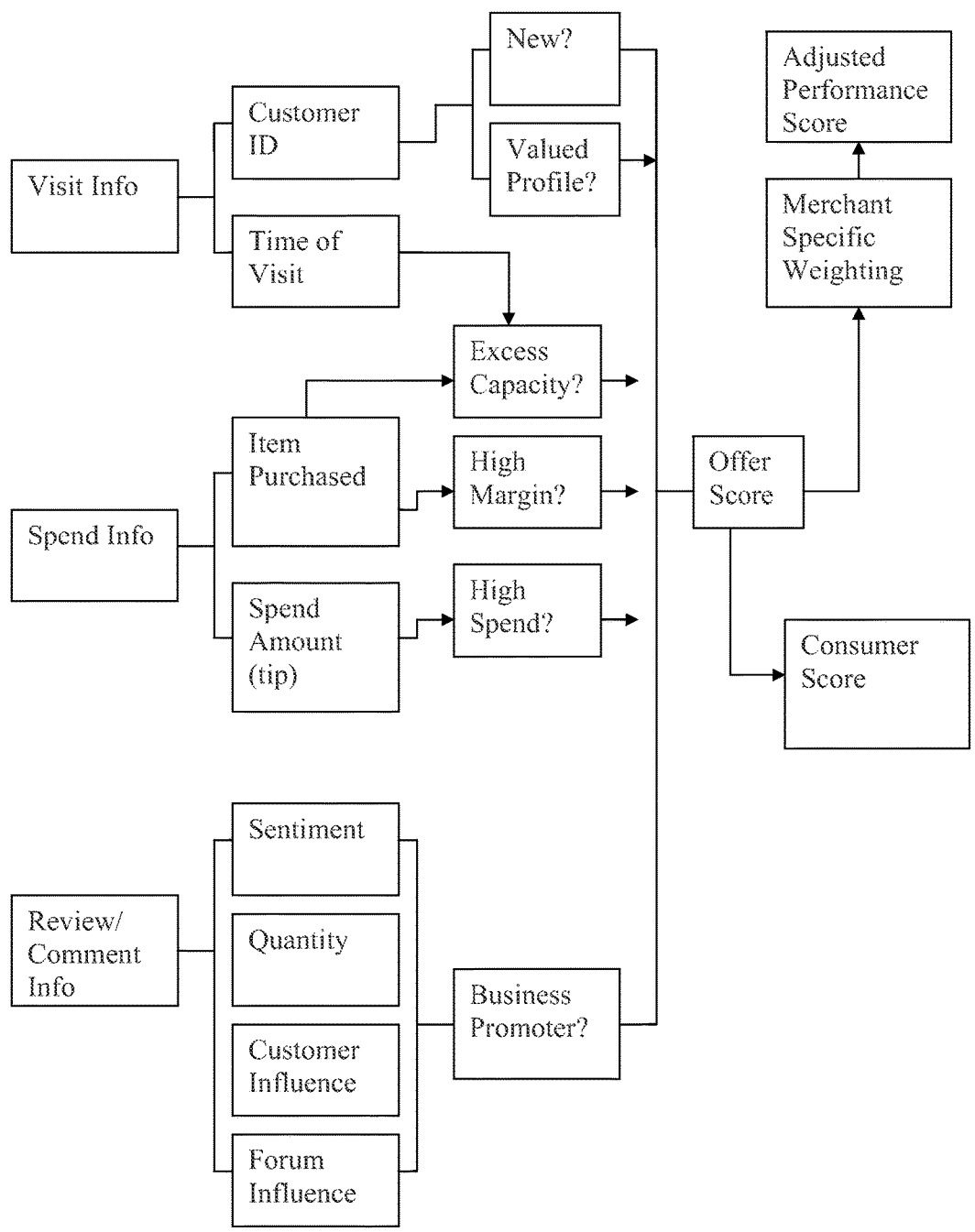
Figure 7: Offer Performance Measurement

METHOD AND SYSTEM FOR MANAGING A CUSTOMER LOYALTY AWARD PROGRAM

FIELD OF INVENTION

The invention provides a system for merchants to provide a promotional incentive to customers to initially try the services of a local merchant and to repeat usage of the merchant's services. In one embodiment, the service operates with Internet-based vendors. In another embodiment, the service operates with so-called "brick and mortar" stores using uniquely identifiable coupons. In yet another embodiment, the service is operated as a third party to the transaction between the vendor and the customer. In yet another embodiment, the service is provided to the vendor as a software product that can be operated by the vendor. In yet another embodiment, the system automatically calculates a discount deal proposal for a vendor that provides the vendor a guaranteed response, and then tracks whether the guarantee was met if the vendor has accepted the deal. The result of the deal is automatically tracked and the parties appropriately credited using electronic cash or credit mechanisms.

BACKGROUND

It is well known that a vendor often rewards a customer for their own frequent purchasing or use of the vendor's goods or services. It is also known that vendors will offer a discount to a first-time customer in order to promote new business. However, there is a need for a system to offer a vendor the ability to award a customer for its initial business and repeat business, yet also use the services of a third party in order to avoid incurring its own costs of operating an automated discount program. Vendors may perceive a risk in adopting a customer award program because they may not be able to predict with any kind of certainty whether the offer of a reward program will actually be profitable. Therefore, there is a need for a mechanism that provides the vendor a guarantee as to the financial performance of the award program. As a result, there is a need for the service that provides the award program as a service to determine the risks of the award program prior to offering a guarantee to a vendor.

DESCRIPTION OF THE FIGURES

1. Data Message Flow Architecture
2. System Architecture
3. Flow Chart for Deal Parameter Determination
4. Flow Chart for Target User Determination
5. Flow Chart for Guarantee Determination
6. General System Flow for Deal Determination and Feedback.
7. Flow Chart for Offer Performance Measurement.

DETAILED DESCRIPTION OF THE PREFERRED EMBODIMENTS

The system operates on one or more computers, typically one or more file servers connected to the Internet. Specific embodiments for the equipment and data network are discussed below. In one embodiment, the protocol for communication is by web-page access using typical Internet protocols, or using FTP (File Transfer Protocol), and the invention will be explained in that context. However, the invention is not limited to those specific communication protocols and can include any kind of data communication or messaging protocol. All that is necessary is that one computing device to transmit a data message to another computer device over some kind of data connection. A customer's computer can be a personal computer, mobile phone, mobile handheld device like a Blackberry™ or iPhone™ or any other kind of computing device a user can use to send and receive data messages.

Figure 1:
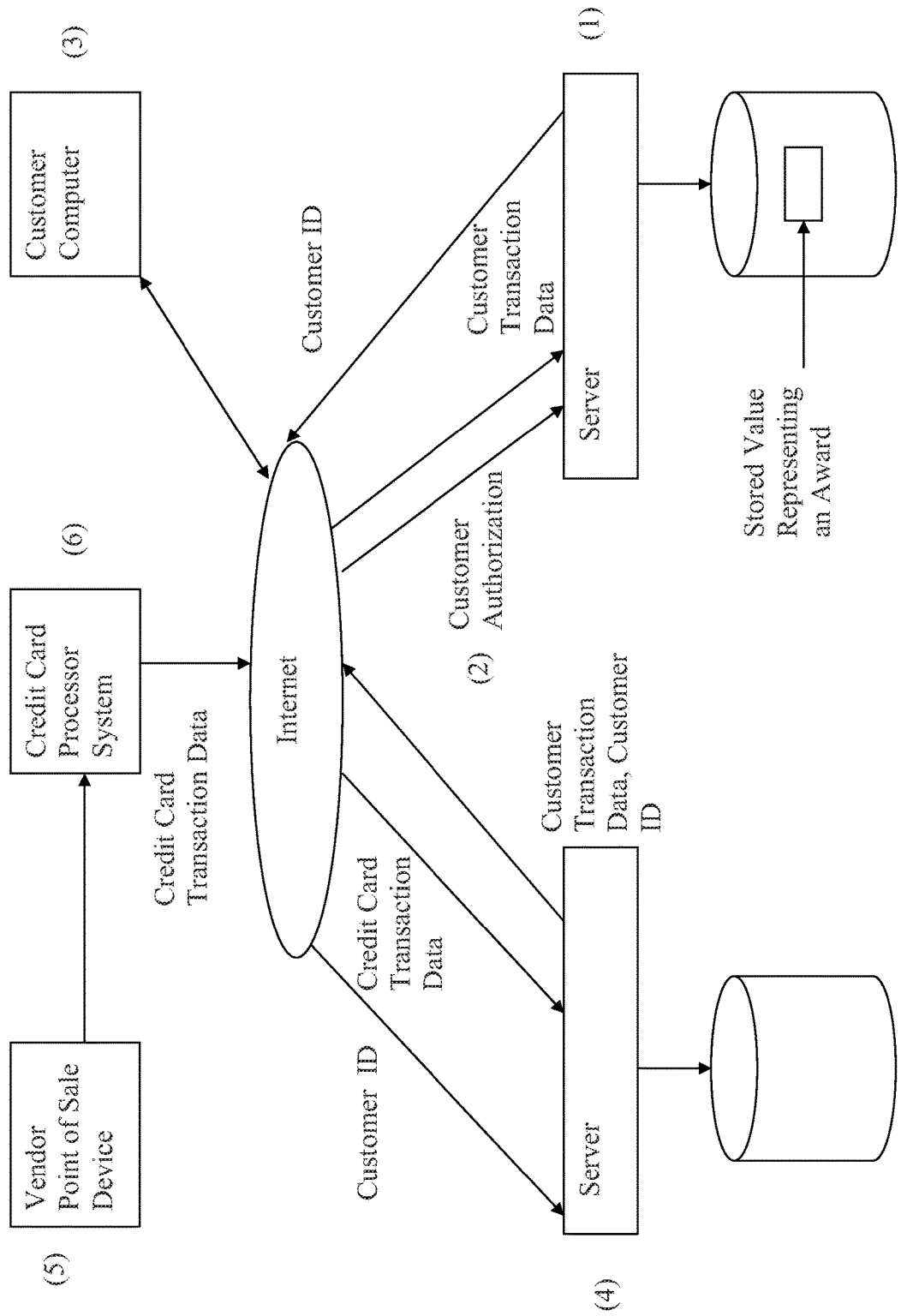
Figure 2:
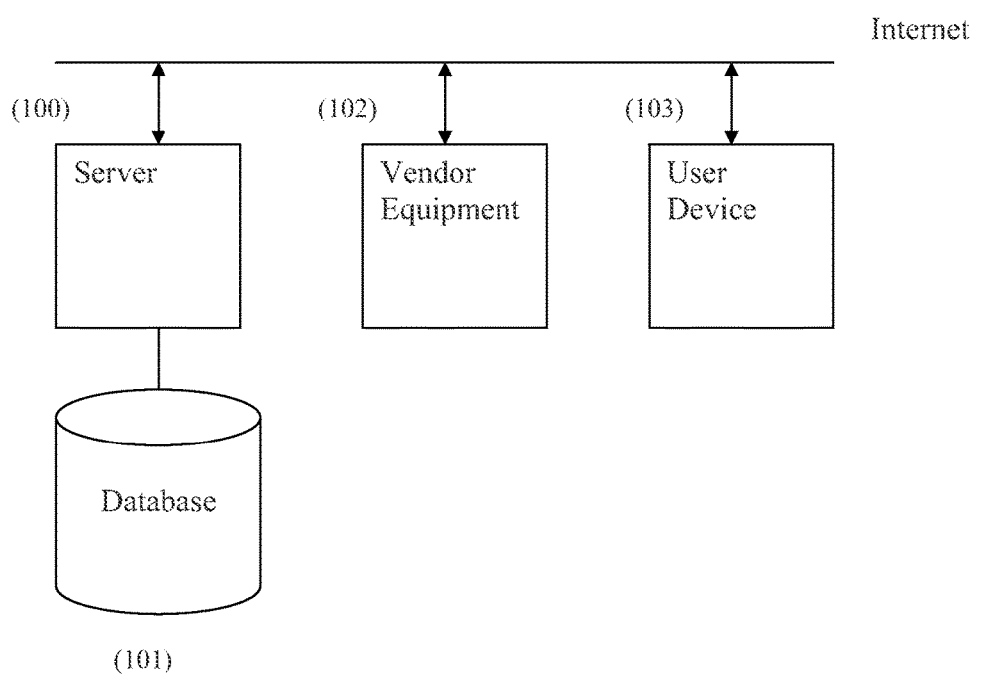
Figure 3:
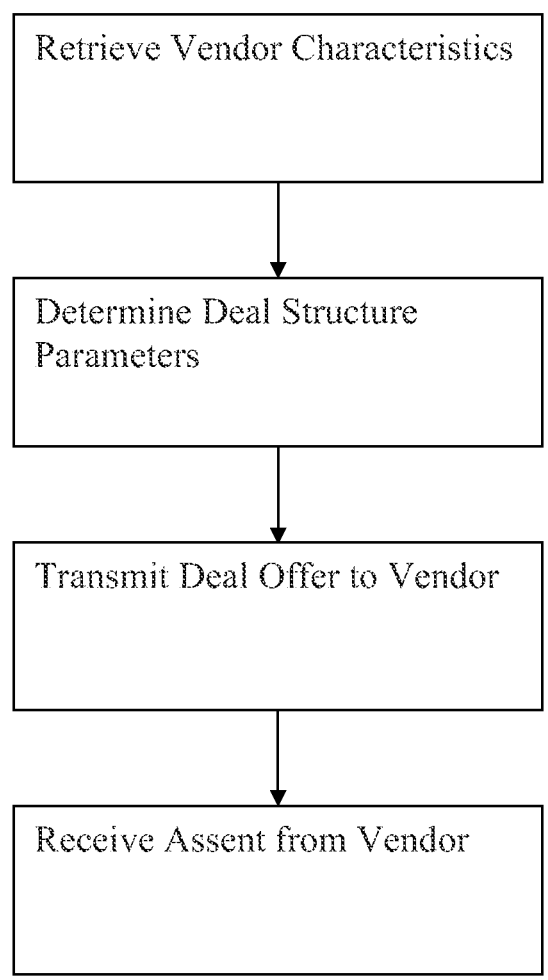
Figure 4:
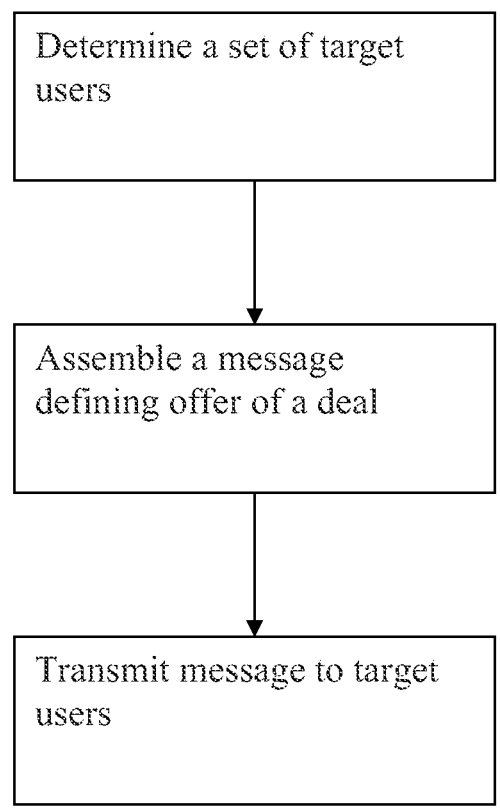

Referring now to FIG. 1, the first web-site, represented by server (1) is accessed by the customer, typically by the customer's computer device (3) accessing the first website's web-page. The customer may receive an offer to participate in the discount program that is transmitted to the customer's computer, either as an email, a webpage, a pop-up advertisement on a webpage, or as an offer displayed when the customer is buying other goods or services from the first website. At some point in the interaction, the customer authorizes the first web-site to track the customer's purchasing activity at one or more participating vendors. In one embodiment, the authorization is part of the purchasing process the customer can make for purchasing a good, service or a virtual discount coupon from the first website. For example, at the time of purchase authorization, the offer to participate in the discount program can be made with a check box on a webpage. In another embodiment, the system uses the customer's email address as the identifier. In one embodiment, the Customer ID is the last 6 digits of the customer's credit card. In one embodiment, the customer pre-purchases a coupon for obtaining goods and services from the participating one or more vendors and submits a credit card number for payment. After receiving the customer authorization (2), the first website transmits all or a subset of digits of the customer's credit card number and a Customer ID, which is a number or other alphanumeric string that is intended to be unique to the individual customer, to a service operating on a different set of servers (4). Where the Customer ID is not derived from the customer's credit card number, the credit card number or a set of such data sufficient to uniquely identify the customer's purchasing activity is also transmitted. When the customer further patronizes the participating vendor, the vendor's point of sale system (5) will send credit card transaction data to a credit card processor (6). All of the vendor's credit card transaction data is transmitted to the second system (4) for filtering. In one embodiment, credit card transaction data comes from the vendor's credit card processor. In another embodiment, the data comes from the vendor's acquiring bank. In another embodiment, the data comes directly from the vendor's point of sale device that accepts the credit card. In another embodiment, the data comes from the customer's credit card association, such as VISA™ or Mastercard™. In yet another embodiment, the data comes directly from the vendor through a service provided by server (1). The second system can operate as a separate service. In another embodiment, the vendor's point of sale device or the credit card processor can perform the function of filtering and therefore operates as the second system. The second system (4) filters the data to obtain the credit card transaction data associated with the Customer ID. This data is then transmitted bade to the first web-site (1). In one embodiment, the raw data is transmitted back to the first web-site. In another embodiment, the data is summarized to state the amount of money spent by a specific customer ID during a predetermined period with a particular participating vendor.

In one embodiment, the Customer ID can be associated with one credit card number or with multiple credit card numbers. The filtering service can deliver a report that cites the Customer ID for all transactions using any of the credit card numbers associated with a Customer ID. In that case, each credit card number and associated Customer ID is delivered to the filtering service. The filtering service then maintains a database that links a Customer ID with the set of associated credit card numbers. In another embodiment, the Customer ID is a username or a randomly generated alphanumeric string that is associated by the first web-site with a username and password. The filtering service receives the Customer ID and the credit card digits to be filtered, but not the username and password. In another embodiment, the functionality of the second server is housed in the first server, such that the first website not only offers the customer the ability to participate, but also conducts the filtering function on the credit card transaction data.

Discount Deal Guarantee:

Vendors may be concerned that by offering a discount to attract customers, that the volume of customers that they expect does not offset the foregone revenue of the discount applied to the customers that actually respond to the offer. Therefore, in another embodiment of the invention, the invention determines a guaranteed "spend" to the participating vendor. This guarantee could be in the form of a per transaction amount, e.g. a customer at a restaurant that uses the voucher will spend at least $60, or an average, e.g. for all customers that use the discount vouchers, they will spend on average $60 per customer. The determination is made automatically. The system retrieves from memory data representing characteristics of the vendor. For example, the vendor will have a type of good or service, perhaps one or more locations in one or more cities, and a past customer transaction history that indicates when customers purchase from the vendor and their average spend per transaction. In one embodiment, as an example, not meant to limit the breadth of the claims, the characteristic data could indicate: (i) vendor is a restaurant, (ii) it is located in the East Village of New York City, (iii) its prime sale time is from 5.30 PM to 10 PM and (iv) the average spend per customer is $60. Other characteristic data may include: transaction history with a given vendor (or similar vendor) for the plurality of purchasers from that vendor (or similar vendor), popularity of the vendor, ratings on the vendor, category of the vendor (e.g. Japanese sushi vs. Texas BBQ), and the brand of merchant (including whether it is famous, not famous, international, national or local). An additional characteristic that is relevant are the parameters defining past guarantee deals that the vendor has participated in and the resulting customer traffic and per-customer spend amount above or below the guarantee. In yet another embodiment, characteristics that may be used to determine the deal parameters include: the vendor's reported average transaction size, vendor's average transaction size as reported by a third party financial institution, vendor's average transaction size as determined from prior system activity, that is, prior offers of a guarantee deal. This data is stored in a data record that can also include the vendor's address, business office address, contact information and bank account information sufficient to consummate on-line cash transactions between the system and the vendor.

Once the vendor characteristics have been retrieved from the database, the system will calculate a guarantee deal for the vendor. The calculation of the deal requires determining a number of parameters, First is determining a guaranteed spend per transaction. In another embodiment, the guarantee is represented as an average spend per transaction over all the customers that use the discount voucher. The deal also includes a parameter representing the value of the commission paid to the service operating the system for those transactions that exceed the guarantee amount. In another embodiment, the commission would apply to the total amount of spend above the guaranteed average spend. The deal parameters can also include the number of discount vouchers that will be distributed to a target user base. The deal structure parameters can include one or more of: (i) a guarantee amount that a user will spend if they show up (e.g. $60 for dinner), (ii) a discount amount, (e.g. 20% off), (iii) a voucher value (e.g. $20), (iv) terms and restrictions (e.g. expiration date, alcohol not included), (v) commission amount (e.g. 20% on spend above guarantee), or (vi) a commission kicker (e.g. 30% on spend above 20% above guarantee). The calculated deal is thereby represented by a string of parameters stored in a data structure in the database that includes a reference to the vendor.

In one embodiment, the calculation of the deal structure parameters is made by restricting the guarantee to a single category with known customer spend characteristics (such as restaurants), and structuring the commission as a money back guarantee where all of the commission for all vouchers is either charged or forfeited based on whether the average total spend per customer (of users opting in to share their spend history) exceeds the guarantee amount in a specified time period. Inputs could be calculated as follows:

1) Performance Threshold: Total Average Spend/Customer=Average Entire Amount*n (where n=the average assumed party size for restaurants of a similar type based on previously measured transactions from a similar restaurant, overall industry averages, or information as reported by the vendor, or a third party).
2) Commission amount is a predetermined rate or 100% refund to merchant,
3) Voucher Value=V*Total Average Spend Performance Threshold (where V is the amount of the voucher and is set based on prior measure performance to optimize the tradeoff between consumer appeal of the deal (higher value vouchers increase purchase rate) and merchant profitability (lower value vouchers increase merchant profitability by increasing the amount of undiscounted overspend above the voucher value).

In another embodiment, the vendor characteristics are used to review guarantee deals that have been executed by similarly situation vendors. In the example above, a guarantee deal can be calculated using information about other restaurants in the East Village of New York City, or other sushi restaurants in New York City. This information can include the average spend per customer. If one restaurant in the East Village averages $60 per transaction, then offering another restaurant a guarantee over that amount would only be justified if other characteristics indicated so, for example, that the latter vendor is more famous or the ratings of the restaurant are higher than the first vendor. In yet another embodiment, the system relies on feedback to determine a deal. In this embodiment, data representing past performance of deals executed by the vendor or similarly situated vendors are used to adjust the calculation of deals for that vendor or similar vendors going forward.

Alternate Guarantee Structures and Offer Performance Score:

While guarantees can be structured around the amount a customer spends, it is also possible to guarantee other aspects of customer behavior and to capture those in an offer performance score that is geared to measure the offer performance against a variety of merchant/advertiser objectives. For example a merchant/advertiser may wish to maximize the number of customers acquired by an offer who are new, or who match some type of customer profile. Alternately a merchant may also wish to structure an offer to target users who utilize excess capacity (e.g. patronize a restaurant during slow periods, or retail customer who purchase excess inventory). A merchant may also wish to target users who purchase high margin inventory or who promote the business by writing reviews or making positive statements about the business online or who measurably drive referrals through some means.

All of these customer behaviors can be captured, counted, and given a score. We call these customer actions an "event." Where for each merchant offer, the offer score is:

$$OS = \sum_i EV_i * EN_i$$

where OS is the offer score, $EV_i$ the event value for i event types and $EN_i$ is the number of times the $_i$th type of customer event occurs. $EV_i$ is a predetermined number related to the expected value of the offer to the merchant. In another embodiment, each $EV_i$ can be modified by a unique coefficient to tailor the OS function to the application itself.

The overall offer performance measurement can be tailored to a merchant's objectives by applying a merchant specific weighting factor to the offer score where for each event: APS=OS*MWF; where APS is the Adjusted Performance Score and MWF is the merchant weighting factor. The MWF can be a predetermined value.

With such a system, a merchant could place different values on new users referrals vs. the amount of excess capacity purchased by the user vs. the reviews or positive things a user says about the merchant in various online forums depending on whether their goal was to reach new users, optimize their yield, or improve their reputation.

In this mode, guarantees could be set to either decrease commission/ad cost for underperformance or to increase commission/ad cost for over performance on a variety of offer performance criteria.

For each performance criteria, performance thresholds could be set based on any combination of the following data inputs which would be stored in the system database: prior measured behavior of the targeted users with the merchant in question or similar merchants, prior measured behavior of similar users to the target set, reported behavior based on industry information, merchant reports, or third party reports. For thresholds based on groups of users other than the specific targeted group standard statistical methods could be used to establish confidence intervals for predicted behavior and these confidence intervals would be factored into the thresholds.

Commission or ad pricing could be altered according to offer performance score in discrete steps: Assuming predetermined threshold values X and Y, if APS≥X but ≤Y, then C=1 where C is the commission; If APS≥Y, then C=1*B, where B is a bonus factor; If APS≤X, then C=1*P where P is penalty factor or discount.

Commission or ad pricing can be dynamically altered in another embodiment by some performance function. For example, C=[APS/POPS]*BC, where APS is the Adjusted Performance Score, POPS is the predicted offer performance score and BC is the Base Commission.

POPS is determined by using the same calculation as for OS but with assumed predicted values for the $EN_i$. The values may come from prior offers or events at that merchant or a similar merchant. As further shown in FIG. 7, this is a process that provides feedback from prior offers to determine the appropriate guarantee parameters for a new offer. In FIG. 7, the Sentiment=Positivity or negativity of the review/comment. Customer influence=ability to impact buying decisions*number of people they can influence. Forum influence is a value representing the relative importance of the place where the review was posted (one site may be more influential than another).

The offer performance score could alter the commission at a customer level (offer performance for that customer alters the commission on their offer), customer group level (average offer performance for the group of customers alters the commission for their offers), or an aggregate level average offer performance for ail users alters commission for all users.

Once the deal is calculated, a data message representing an offer is transmitted to another system that is operated by the vendor. This message could be in the form of an email offer. This offer is submitted to the merchant or vendor. In another embodiment, the vendor's personnel can log into a website operated in conjunction with the system, and then request a guarantee deal. The deal parameters can then be presented on the webpage that the vendor's personnel Is accessing. In that case, the deal parameters are transmitted to the vendor's computer as part of the webpage content. In either case, the deal parameters are transmitted to the vendor. If the vendor accepts the offer, the vendor can either reply to the email with an indication of assent or actuate a virtual button on the webpage displayed on their computer. In either case, a data message is transmitted back to the system indicating assent by the vendor to the guarantee deal.

The offer to the merchant may involve another proposed offer to the existing or prospective customers. To avoid confusion, the customer offer is the deal the customer gets, while the offer to the merchant or vendor is the deal that the vendor gets, which the customer offer may be a part of. The customer offer component of the deal is also represented by a data message intended for customers. This offer message can contain a percentage discount, or a voucher value that can be redeemed at the vendor. In other embodiments, expiration dates or other limitations may be included. Once the data message has been assembled, it can be transmitted to a targeted user group. The transmission may be by email, text message, Twitter™ or any other data message medium. In yet another embodiment, users my log into a website operated in conjunction with the system and request or otherwise observe available deals, listed by vendor, vendor type, location or combinations thereof. In either case, the deal voucher dta is transmitted to the selected target users.

Target users are selected automatically. In one embodiment, the users are all known to the system as past participants. Their purchase history with other vendors (or the same vendor) is known. Users may be filtered by their average spend amount at that or similar vendors. In the example given above, the system may be able to filter its users down to those who spend on average at least $60 per transaction at any restaurant in the East Village of New York City. Once the target users are determined, the voucher messages are transmitted.

The vouchers may be either distributed for free or sold. In the latter case, the user receives a data message representing the voucher offer. If the user wants to use the voucher, they transmit a message back to the system representing an assent to the voucher offer. This may include the user transmitting payment instructions, credit card information or some other form of data message that represents cash payment for the voucher. One way is by an email reply. Other embodiments include text messaging, Twitter™ messages or actuation of a virtual button on a webpage displayed on the user's computer. The identity of the user, their assent and a reference to the deal that the voucher is associated with are stored in the database. The value paid for the voucher may be an amount paid to the operator of the system while the system maintains in its database a datum representing the value of the purchased vouchers associated with that vendor as an account balance. That datum can be stored in the database in a data structure associated with the vendor.

Once the user purchases the goods or services from the vendor, data representing that transaction is received by the system. That information may include a serial number associated with the voucher that the user had purchased from the system. Using that information, the system can track the total spend of the user, which Is the value of the voucher plus any additional amount charged to a credit card, debit card or some other electronic payment mechanism, for example, PayPal™. That transaction is also then associated with the appropriate deal. If the guarantee is per-user, the system can immediately calculate whether for that user, the guarantee spend per transaction was met. In another embodiment, the system waits until after the vouchers have expired or when all or a predetermined number of the vouchers have been used. At that point the system can calculate whether the guarantee was met on an average basis, e.g. whether the revenue from ail of the users divided by the number of users exceeded the guaranteed average spend per user. In the event the guarantee was not met, the system calculates the amount that the vendor should be credited and then assembles a data message that instructs an on-line payment system to credit the account of the vendor the amount of the shortfall. In another embodiment, the shortfall amount is added to the account of the vendor to create a balance due.

If the system determines that the guarantee was met, the system then calculates the amount owed to the operator of the system. In one embodiment, if the guarantee was met, then the vendor pays the operator of the system a commission on the amount of spend above the guarantee. The system calculates the amount of commission and then deducts that amount from the account balance value associated with the vendor that is stored in the database. In yet another embodiment, the system assembles a data message representing an invoice and transmits that invoice to the contact information associated with the vendor. In yet another embodiment, the vendor transmits an electronic payment instruction to an electronic payment service that then credits the account of the operator of the system. One method of calculating the commission is to calculate the commission on each transaction above the spend guarantee. Another method is to calculate the commission on the total spend above the value of the guarantee spend per user times the number of users.

In a guarantee that was structured as an all or nothing money back guarantee based on total average spend per customer (as measured based on transactions of users who opted to share their spend history), commissions on both redeemed vouchers and unredeemed vouchers would be refunded to the merchant if the average total spend per customer didn't reach the guaranteed amount.

As offer performance guarantees can be structured based on a number of desired consumer behaviors, consumer rewards can also be based on these same behaviors. Indeed the goal of consumer rewards is to incent the desired consumer behavior to drive offer performance. As consumers redeem offers they can receive points based on their behavior encompassing things like, but not limited to: their spend, whether they are new to a merchant, whether they purchase excess capacity, or high margin products, or promote the business through positive comments in some measurable forum. A consumer could also potentially receive points based on how their demographic profile meets a desired customer profile for the merchant. Different point values could be established to credit behaviors in proportion to their relative value, and the sum of these point values could be totaled per user and would be called their consumer score. This consumer score would establish their eligibility for awards.

Figure 5:
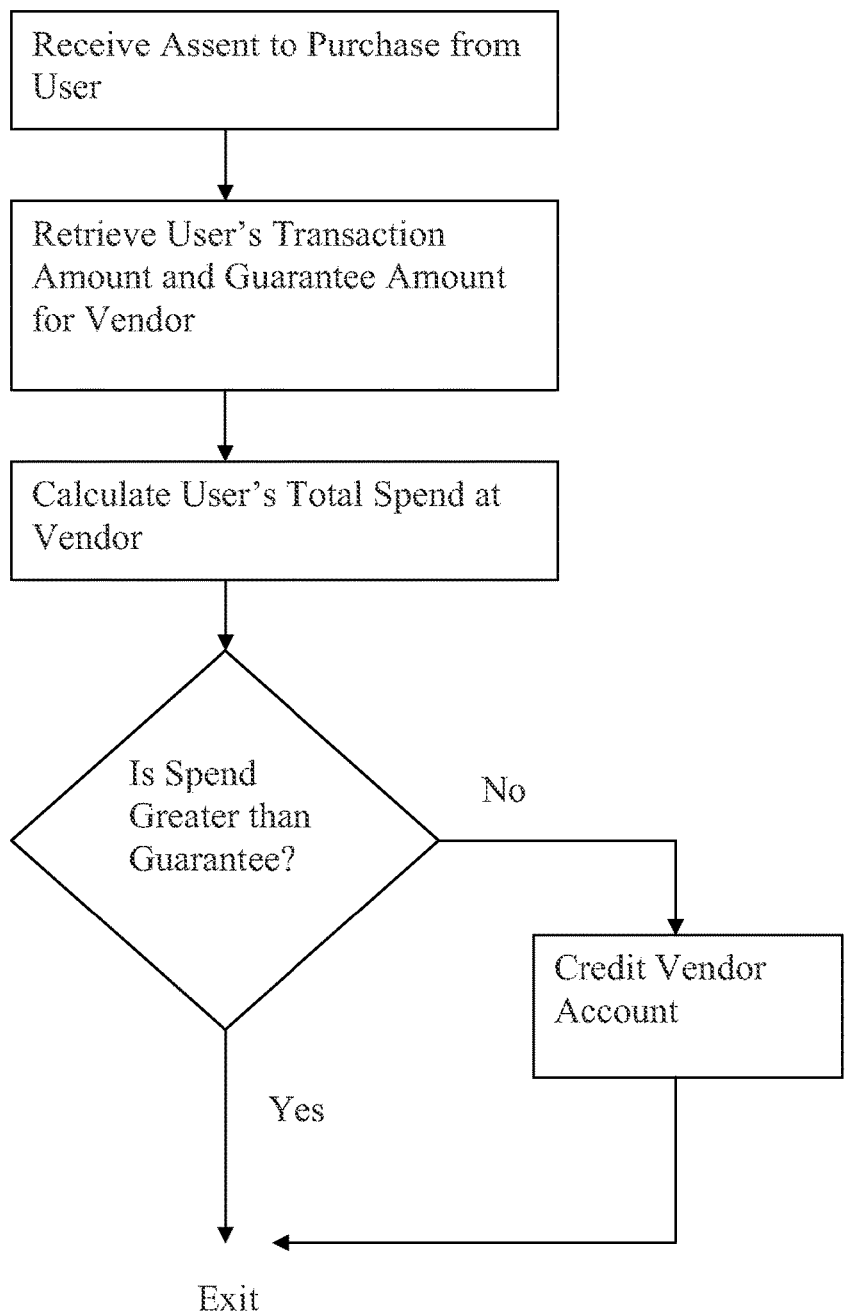

Awards can be of many types. In one embodiment, the award is a credit of monetary value that can be used for a purchase of goods or services offered from the first website. In another embodiment, the award can be a credit of monetary value that can be used to purchase goods or services from the vendor whose transactions contributed to the award. In yet another embodiment, the award can be monetary value that can be used to purchase goods or services from any vendor participating in the program that is offered through the first website. In yet another embodiment, the award can be an actual product or service, for example, an appliance, or a free massage provided by a participating vendor.

Where the award is a good or service, the award value can indicate that in the alphanumeric coding associated with the award. For example, a data record comprising the award value may have a first alphanumeric string that indicates as a logical condition whether the award is a numeric value or a product or service. If the latter, the second string is interpreted as a serial number that is associated with a product or service that is the designated award. If the former, the second string is interpreted as a numeric monetary value. This value is adjusted based on additional awards, which increment the value, or further purchases using the award, which decrement the value. If the first string indicates a status award, then the second string can represent the value of a discount that would be applied to purchases on the first website, for example, a percentage. FIG. 5 shows a typical customer data record indicating one award, represented by the two data elements award type and award value. In other embodiments, the customer data record can contain more than one award data element so that several different awards associated with several different vendors can be supported. In yet other embodiments, the data associated with the customer can be stored across multiple data records, as in a relational database where the customer ID is used as an index value.

Each participating customer is represented by a data record in a database stored and maintained by the first website. Customer ID's are stored in a database that also links the Customer ID to the award value associated with the vendor or associated with the first website.

When the system determines that the pre-determined award is to be made, the data record for that customer ID is modified to increment the amount of discount or award value associated with that customer ID. In one embodiment, the award is associated with the vendor whose patronage met the pre-determined threshold. The award serial number in the data record can be mapped to a specific vendor, or even a discount made by the vendor. In another embodiment, the award is associated with the first web-site, such that the customer can use that award as a credit with any participating vendor that accepts the first web-site's credit as a form of payment or partial payment for goods and services. In another embodiment, the amount of the award credit can be set by the vendor. For example, the vendor or the first website can set the amount of the credit to be equal to 20% of the transaction amount in excess of the value of the purchased coupon.

A customer that has an award value can use that award value to purchase goods and services from the first website. The customer can use the customer's computer to access the first website's one or more webpages. These webpages display one or more coupons or other indicia of purchase value for goods and services offered by various vendors. The customer can then purchase one or more of these coupons. During the purchase transaction, the first website displays a payment page that is transmitted to the customer's computer. That page permits the customer to select a form of payment. One of the selections can include a designation of the award value associated with the customer's Customer ID. If selected, the first website will use the indicated price of the good or service being purchased and subtract that value from the stored award value. If the price is greater than the award value, the remaining balance of the purchase price can be paid by the customer selecting a credit card or some other on-line payment system like PayPal™.

Operating Environment:

The system is typically comprised of a central server that is connected by a data network to a user's computer. The central server may be comprised of one or more computers connected to one or more mass storage devices. A website is a central server that is connected to the Internet. The typical website has one or more files, referred to as web-pages, that are transmitted to a user's computer so that the user's computer displays an interface in dependence on the contents of the web-page file. The web-page file can contain HTML or other data that is rendered by a program operating on the user's computer. That program, referred to as a browser, permits the user to actuate virtual buttons or controls that are displayed by the browser and to input alphanumeric data. The browser operating on the user's computer then transmits values associated with the buttons or other controls and any input alphanumeric strings to the website. The website then processes these inputs, in some cases transmitting back to the user's computer additional data that is displayed by the browser. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the customer may receive from and transmit data to the central server by means of the Internet, whereby the customer accesses an account using an Internet web-browser and browser displays an interactive webpage operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange Information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present Invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can am an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A computer implemented method executed by a computer system of managing a customer loyalty program of at least one vendor, the method comprising:

accessing data and instructions from a discount program database, the data including vendor characteristics of at least one vendor including a type of goods or services offered by the at least one vendor, a customer transaction history of the at least one vendor or other vendors having similar characteristics to the at least one vendor, and a location of the at least one vendor;

providing a vendor discount program viewer application executed by at least one processor of the computer system to receive at least one input for a guarantee deal from the vendor;

receiving, over the Internet through a web page at the vendor discount program viewer application, a request for a guarantee deal from a vendor system;

retrieving from the discount program database the vendor characteristics of the at least one vendor;

retrieving from the discount program database historical data representing past performance of deals executed by vendors having similar characteristics, wherein the historical data comprises at least a customer transaction history associated with unique customer identifying data;

generating, using the at least one processor, a set of guarantee deals for the at least one vendor based on the retrieved vendor characteristics and the historical data;

determining, using the at least one processor, a performance score for each guarantee deal in the set of guarantee deals based on a performance measure parameter and a vendor specific weighting factor;

selecting, using the at least one processor, at least one guarantee deal from the set of guarantee deals based on the performance score, the selected guarantee deal including at least one customer offer represented by a data message, wherein the customer offer is associated with a first website such that a customer computer device is configured to apply the customer offer as a credit with any participating vendor that accepts the first website's credit as a form of payment or partial payment for the goods or services;

transmitting, using the at least one processor, the selected guarantee deal over the Internet via a web page to the vendor system, wherein said transmitting causes a remote user interface of the vendor system to display the selected guarantee deal to the vendor on the web page;

receiving a data message transmitted from the vendor system using a virtual button of the web page indicating assent to the selected guarantee deal; and updating the discount program database to reflect the guarantee deal transmitted to the vendor;

transmitting, from the computer system, the data message including the customer offer via the first website accessible to the customer through the customer computing device;

verifying, at the computer system, acceptance of the customer offer though the first website from the customer computing device;

generating, at the computer system, unique customer identifying data;

transmitting, from the computer system, the unique customer identifying data over the Internet to a tracking computing system, the tracking computing system tracking customer activity by filtering received transaction data associated with the unique customer identifying data to generate filtered tracking data linking a transaction with at least one customer;

receiving the filtered tracking data over the Internet from the tracking computing system; and updating the discount program database utilizing the received filtered tracking data.

2. The method of claim 1 wherein the data representing the vendor characteristics further includes at least one of: popularity of the vendor, ratings on the vendor, category of the vendor, brand of the vendor, customer transaction history, past guarantee deals, and vendor's reported average transaction size.

3. The method of claim 1 wherein the performance measure parameter is at least one of: guarantee spend per transaction, average spend per transaction, value of the commission paid to a third-party, number of discount vouchers, guarantee amount spent by a customer, discount amount, voucher value, and category of the guarantee deal.

4. The method of claim 1 further comprising:
determining data representing a customer offer, said determined data derived from the discount program database;

determining a set of target users, said determining step being based on data representing actual prior performance of the selected discount deal for the vendor, or the performance of the selected discount for a similar vendor; and transmitting a data message representing the customer offer to the determined target users.

5. The method of claim 4 further comprising:
receiving a data message representing at least one target user's assent to purchase the customer offer;
receiving a data message representing a transaction amount of the at least one target user at the vendor associated with the customer offer;
retrieving from a data storage the value of the customer offer purchased by the at least one target user;
calculating total spend for the at least one target user; and
determining whether the total spend of the at least one target user is equal to or greater than the performance measure parameter.

6. The method of claim 5 wherein the total spend is computed by calculating the average spend of all target users who purchased a customer offer for a predetermined number of transactions by the target users.

7. The method of claim 6 further comprising:
in the case where the determining whether the average total spend step is not equal to or greater than the performance measure parameter, determining a shortfall amount and either adding that shortfall amount to an account value associated with the vendor stored in the discount program database or transmitting a data message representing instructions to credit an account associated with the vendor the amount of the shortfall.

8. The method of claim 6 further comprising:
in the case where the determining whether the average total spend step is equal to or greater than the performance measure parameter, determining a commission amount and either deducting that shortfall amount from an account value associated with the vendor stored in the discount program database or transmitting a data message representing an invoice for the amount of the commission to the vendor.

9. The method of claim 8 wherein the determining a commission step includes determining whether the average spend exceeded the performance measure parameter by a pre-determined amount and if so, applying a commission kicker to the commission calculation.

10. The method of claim 5 further comprising:
in the case where the determining whether the total spend step is not equal to or greater than the performance measure parameter, determining a shortfall amount and either adding that shortfall amount to an account value associated with the vendor stored in the discount program database or transmitting a data message representing instructions to credit an account associated with the vendor the amount of the shortfall.

11. The method of claim 5 further comprising:
in the case where the determining whether the total spend step is equal to or greater than the performance measure parameter, determining a commission amount and either deducting that shortfall amount from an account value associated with the vendor stored in the discount program database or transmitting a data message representing an invoice for the amount of the commission to the vendor.

12. The method of claim 11 wherein the determining a commission step includes determining whether the spend exceeded the performance measure parameter by a predetermined amount and if so, applying a commission kicker to the commission calculation.

13. The method of claim 5 wherein the determining whether the total spend step is made by calculating the average spend of all target users who purchased a voucher for a predetermined number of transactions by target users who purchased the voucher offer.

14. The method of claim 4 further comprising:
receiving a data message representing at least one target user's assent to purchase the customer offer;
receiving at least one data message representing an at least one event by the corresponding at least one target user related to the vendor associated with the customer offer;
determining a performance score based on the at least one corresponding event data; and
determining whether the performance score is equal to or greater than the performance measure parameter.

15. A system for managing a customer loyalty program of at least one vendor comprising:
a discount program database storing data and instructions thereon, the data including vendor characteristics of at least one vendor including a type of goods or services offered by the at least one vendor, a customer transaction history of the at least one vendor or other vendors having similar characteristics to the at least one vendor, and a location of the at least one vendor; and
at least one computer processor configured to access the data and instructions over a network, and further configured to perform steps including:
providing a vendor discount program viewer application to receive at least one input for a guarantee deal from the vendor;
receiving, over the Internet through a web page at the vendor discount program viewer application, a request for a guarantee deal from a vendor system;
retrieving from the discount program database the vendor characteristics of the at least one vendor;
retrieving from the discount program database historical data representing past performance of deals executed by vendors having similar characteristics, wherein the historical data comprises at least a customer transaction history associated with unique customer identifying data;
generating a set of guarantee deals for the at least one vendor based on the retrieved vendor characteristics and the historical data;
determining a performance score for each guarantee deal in the set of guarantee deals based on a performance measure parameter and a vendor specific weighting factor;
selecting at least one guarantee deal from the set of guarantee deals based on the performance score, the selected guarantee deal including at least one customer offer represented by a data message, wherein the customer offer is associated with a first website such that a customer computer device is configured to apply the customer offer as a credit with any participating vendor that accepts the first website's credit as a form of payment or partial payment for the goods or services;
transmitting the selected guarantee deal over the Internet via a web page to the vendor system, wherein said transmitting causes a remote user interface of the vendor system to display the selected guarantee deal to the vendor on the web page;
receiving a data message transmitted from the vendor system using a virtual button on the web page indicating assent to the selected guarantee deal;
updating the discount program database to reflect the guarantee deal transmitted to the vendor;
transmitting, from the computer system, the data message including the customer offer via the first website accessible to the customer through the customer computing device;
verifying, at the computer system, acceptance of the customer offer through the first website from the customer computing device;
generating, at the computer system, unique customer identifying data;
transmitting from the computer system, the unique customer identifying data over the Internet to a tracking computing system, the tracking computing system tracking customer activity by filtering received transaction data associated with the unique customer identifying data to generate filtered tracking data linking a transaction with at least one customer;
receiving the filtered tracking data over the Internet from the tracking computing system; and
updating the discount program database utilizing the received filtered tracking data.

16. The system of claim 15 wherein the data representing the vendor characteristics further includes at least one of: popularity of the vendor, ratings on the vendor, category of the vendor, brand of the vendor, customer transaction history, past guarantee deals, and vendor's reported average transaction size.

17. The system of claim 15 wherein the performance measure parameter is at least one of: guarantee spend per transaction, average spend per transaction, value of the commission paid to a third-party, number of discount vouchers, guarantee amount spent by a customer, discount amount, voucher value, and category of the guarantee deal.

18. The system of claim 15 wherein the at least one computer processor further performs the steps of:
determining data representing a customer offer, said determined data derived from the discount program database;
determining a set of target users, said determining step being based on data representing actual prior performance of the selected discount deal for the vendor, or the performance of the selected discount for a similar vendor; and
transmitting a data message representing the customer offer to the determined target users.

19. The system of claim 18 wherein the at least one computer processor further performs the steps of:
receiving a data message representing at least one target user's assent to purchase the customer offer;
receiving a data message representing a transaction amount of the at least one target user at the vendor associated with the customer offer;
retrieving from a data storage the value of the customer offer purchased by the at least one target user;
calculating total spend for the at least one target user; and
determining whether the total spend of the at least one target user is equal to or greater than the performance measure parameter.

20. The method of claim 19 wherein the total spend is computed by calculating the average spend of all target users who purchased a customer offer for a predetermined number of transactions by the target users.

* * * * *